UNITED STATES PATENT OFFICE.

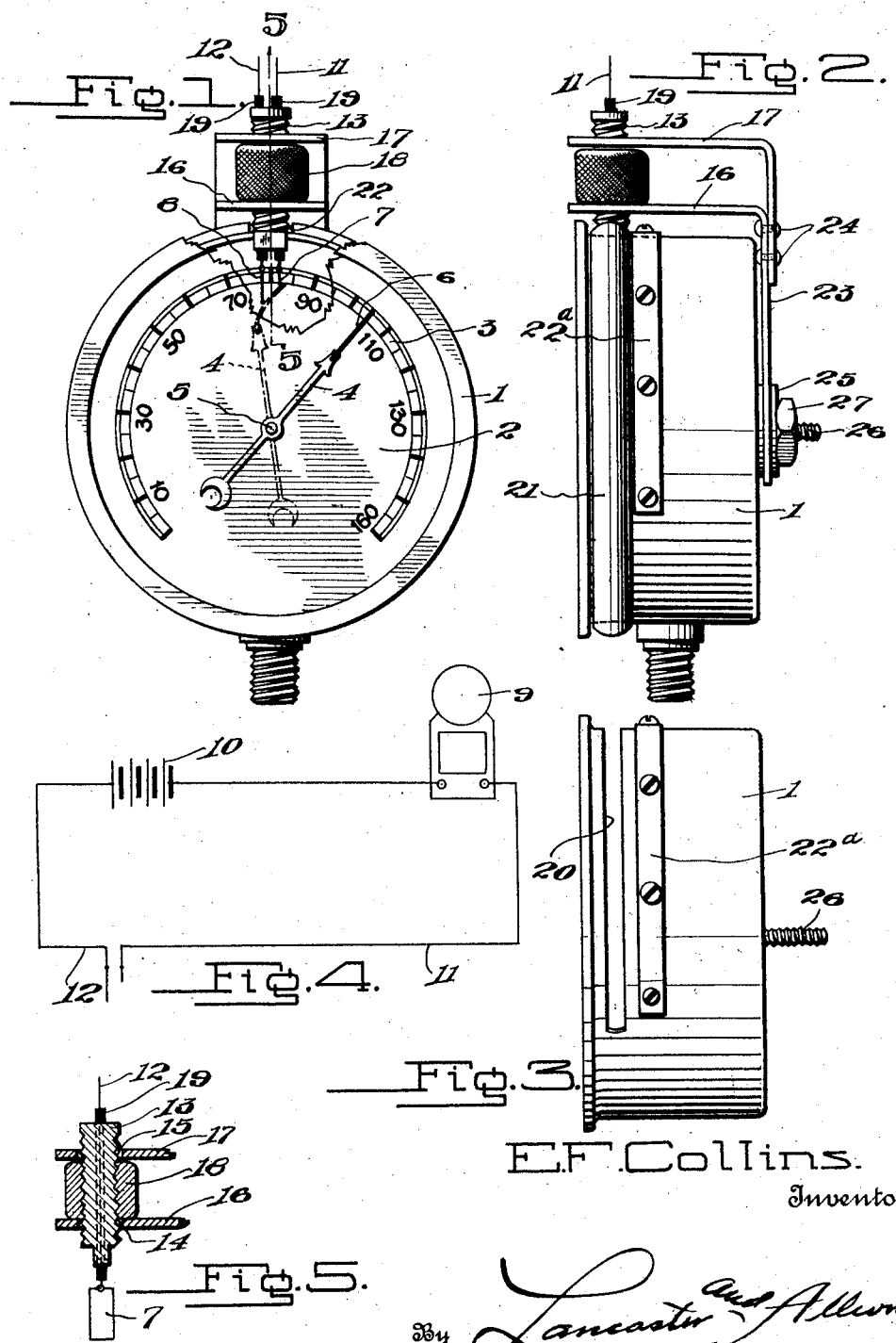

EMERY F. COLLINS, OF HUNTINGTON, WEST VIRGINIA.

SIGNAL.

1,412,451. Specification of Letters Patent. Patented Apr. 11, 1922.

Application filed April 14, 1919. Serial No. 289,847.

*To all whom it may concern:*

Be it known that I, EMERY F. COLLINS, a citizen of the United States, residing at Huntington, in the county of Cabell and State of West Virginia, have invented certain new and useful Improvements in Signals, of which the following is a specification.

This invention relates to signals and more particularly to an electrically operated audible signal adapted for use in connection with a pressure gauge, whereby a signal may be sounded when the indicating hand of the gauge indicates a predetermined pressure.

More specifically, the invention comprehends the provision of a circuit control, for controlling the actuating of an audible signal which circuit control is adjustably carried by the casing of an ordinary pressure gauge in such manner as to permit adjustable movement of the circuit control about the center of the pressure gauge as an axis to move the contacts of said control in alignment with the various graduations of the gauge, and to provide a flexible blade carried by the indicating hand of the gauge which hand is adapted to engage and bridge the contacts of the control to permit of the closing of a circuit therethrough for exciting the audible signal mechanism, thereby causing the sounding of the signal when the indicating hand reaches a predetermined graduation upon the scale of the gauge or when the pressure upon the operating mechanism which controls movement of the gauge falls below a predetermined pressure and also to provide means to permit adjustment of the contacts radially of the axis of movement of the control.

A further object of the invention is to provide a signal mechanism as specified which is particularly adapted for use in connection with the air lines of locomotive trains.

In present conditions, it is very difficult, practically impossible to quickly transmit a signal from the rear end of a long freight train to the engineer in the engine at the head of the train, it being necessary for one of the train men to travel the entire length of the train to give the signal to the engineer, and this often requires considerable valuable time and inconvenience to the operators of the train and it is an object of this invention to provide a signalling mechanism as above specified which may be placed in the engine and connected to the air line of the train, so that by disconnecting the air hose at any place along the length of the entire train, the air line may be bled sufficiently to move the indicating hand of the gauge far enough to bridge the contacts and result in the operation of the signal, thus conveying to the engineer knowledge that there is a leak of air somewhere along the train line and which consequently needs investigation, thereby causing him to stop the train to determine the reason for the bleeding of the air. It is to be understood, of course, that the contacts are to be placed, with respect to the graduations of the gauge, so that they will be bridged by the movement of the hand before sufficient air has been bled from the train line to cause the setting of the air brake of the train.

Other objects of the invention will appear in the following detailed description taken in connection with the accompanying drawing, forming a part of this specification and in which drawing:

Figure 1 is a front elevation, partially in section of an ordinary pressure gauge, showing the movable circuit control mechanism carried thereby.

Figure 2 is an edge elevation of a pressure gauge having the control mechanism associated therewith.

Figure 3 is a detail edge view of the shell or housing of the gauge structure.

Figure 4 is a diagrammatic view of the circuit, and

Figure 5 is a section on the line 5—5 of Figure 1.

Referring more particularly to the drawings, wherein like characters indicate like and corresponding parts throughout the several views, 1 indicates the housing or shell of an ordinary pressure gauge, of the circular type which includes a dial 2, graduated as shown at 3 to indicate, by means of the movable hand 4, various pounds of pressure exerted against the mechanism of the pressure gauge. The hand 4 is mounted to move about a pin 5, carried at the center of the casing 1 as an axis, and it has a flexible blade 6 carried by the point thereof, which flexible blade is adapted to engage spaced contacts 7 and 8, to close a circuit through an audible signal indicated diagrammatically at 9 in Figure 4 of the drawings. The audible signal 9 is in circuit with a suitable supply source or exciter 10 as shown in the diagram in Figure 4, and with wires or suitable conductors 11 and 12 which are in turn connected to the spaced contacts 7 and 8 respectively. The contacts 7 and 8 are carried by a threaded stem 13 which extends through openings 14 and 15 in spaced plates 16 and 17 respectively, between which spaced plates a nut 18 is mounted, which nut adjustably engages the stem 13. The outer surface of the nut 18 is knurled or roughened to facilitate the manual rotation thereof for adjustment of the contacts 7 and 8 radially of the axis of the pressure gauge 1. The wires 11 and 12 extend through suitable insulated sleeves 19, which are spaced from each other and extend through the threaded stem 13. It will be noted by reference to Figure 1 of the drawings, that the contact 7 which is in plate form is shorter than the contact 8 which is also in plate form, so that they may be both engaged by the flexible blade 6 to close the circuit.

The housing or casing 1 of the pressure gauge is provided with an arcuate slot 20 through which the stem 13 extends to position the contacts 7 and 8 in the path of the blade 6. An annular closure ring 21 extends about the housing forming a closure for the slot 20, it being connected in any suitable manner to the stem 13. If it is so desired, the ring 21 may be provided with an opening, as indicated at 22 in Figure 1 of the drawings, to permit insertion of the stem 13 therethrough so that upon movement of the stem in either direction, it will abut the wall of the opening 22 and move the ring 21 therewith. A suitable strap 22ᵃ is provided to prevent movement of the ring 21 longitudinally over the housing 1.

The plate 17 has its end outwardly from the stem 13 downturned, and attached to the downturned portion 23 of the plate 16 as shown at 24. This downturned end or portion 23 of the plate 16 is connected to a washer or collar 25 which is rotatably mounted upon the stem 26. The stem 26 projects outwardly from the axis of the finger 4 aligning therewith, and the collar 25 is retained against movement longitudinally upon the stem 26 by a suitable nut 27, which is positioned in engagement with the collar or washer 25 in such manner as to permit of movement of the stem 13 and its supporting plates 16 and 17 about the stem 26 as an axis, thereby permitting the position of the contacts 7 and 8 at various positions about the scale or graduations of the dial 2 of the pressure gauge, thus the contact members 7 and 8 may be set to control the actuating of the signals 9 at any predetermined position of the hands 4 and consequently at corresponding pound pressure against the operating mechanism of the gauge.

In operation; when the contacts 7 and 8 are placed at any desired point, such as at 80 on the scale 3 of the dial 2 as shown in Figure 1 of the drawings, when the pressure against the operating mechanism of the hand 4 falls below the 80, the hand will consequently move to the proper graduation upon the dial, and in so moving, the outer end of the flexible blade 6 will first contact or engage with the contact 7 and then upon further movement of the hand will engage the contact 8, bridging them and permitting the closing of a circuit through the audible signal 9 and exciter 10.

Changes in details may be made without departing from the spirit of this invention, but;

I claim:

1. The combination with a pressure gauge including a movable hand, of a blade carried by the hand, a stem, a pair of spaced contacts carried by said stem and being positioned in the path of movement of said blade, a nut threaded upon said stem, supporting plates engaging upon each side of said nut for supporting said stem to permit adjustable movement of the stem radially of the axis of movement of said indicating hand.

2. The combination with a pressure gauge including a movable hand, and having a slot about its circumference, of a blade carried by the hand, a stem projecting through the slot in said gauge, a pair of spaced contacts carried by said stem and being positioned in the path of movement of said blade, and an annular ring mounted upon said gauge covering said slot and adapted for synchronous movement with the stem about the circumference of the gauge.

3. The combination with a pressure gauge including an indicator hand, of a stem, means connecting said stem to said gauge for perpendicular and circumferential adjustment with respect to the axis of said indicator hand, a pair of spaced contacts carried by said stem, and in the path of movement of said indicator hand, whereby upon a certain position of said indicator hand the same will engage with said contacts to close a circuit.

4. The combination with a pressure gauge including an indicator hand, of a flexible blade carried by said hand, a pair of spaced contacts, one of said contacts being shorter than the other, said shorter contact being positioned to first contact with said flexible blade, and necessitating only slight flexing of said blade in order to positively close a circuit through said contacts.

EMERY F. COLLINS.